US007006904B2

(12) United States Patent
Pippenger

(10) Patent No.: US 7,006,904 B2
(45) Date of Patent: Feb. 28, 2006

(54) ANTI-HIJACKING SECURITY SYSTEM AND APPARATUS FOR AIRCRAFT

(76) Inventor: Phillip McKinney Pippenger, 400 Main St., #2A, Evanston, IL (US) 60202

( * ) Notice: Subject to any disclaimer, the term of this patent is extended or adjusted under 35 U.S.C. 154(b) by 0 days.

(21) Appl. No.: 10/457,835

(22) Filed: Jun. 9, 2003

(65) Prior Publication Data

US 2004/0078122 A1 Apr. 22, 2004

Related U.S. Application Data

(62) Division of application No. 09/967,026, filed on Sep. 28, 2001, now Pat. No. 6,584,383.

(51) Int. Cl.
*B60Q 1/00* (2006.01)

(52) U.S. Cl. .................... 701/3; 701/2; 701/36; 340/99

(58) Field of Classification Search .................... 701/1, 701/2, 3, 8, 36, 41, 9, 10, 300, 301, 200–213; 455/431; 340/945, 961, 990

See application file for complete search history.

(56) References Cited

U.S. PATENT DOCUMENTS

| | | | | |
|---|---|---|---|---|
| 4,646,244 | A * | 2/1987 | Bateman et al. | 701/301 |
| 5,995,043 | A * | 11/1999 | Murphy | 342/357.03 |
| 6,161,063 | A * | 12/2000 | Deker | 701/4 |
| 6,173,219 | B1 * | 1/2001 | Deker | 701/3 |
| 6,275,773 | B1 * | 8/2001 | Lemelson et al. | 701/301 |
| 6,282,417 | B1 * | 8/2001 | Ward | 455/431 |
| 6,314,366 | B1 * | 11/2001 | Farmakis et al. | 701/201 |
| 6,381,538 | B1 * | 4/2002 | Robinson et al. | 701/211 |
| 6,401,032 | B1 * | 6/2002 | Jamison et al. | 701/207 |
| 6,708,091 | B1 * | 3/2004 | Tsao | 701/9 |
| 6,739,556 | B1 * | 5/2004 | Langston | 244/189 |
| 6,748,325 | B1 * | 6/2004 | Fujisaki | 701/301 |
| 2003/0055540 | A1 * | 3/2003 | Hansen | 701/3 |

* cited by examiner

*Primary Examiner*—Richard M. Camby

(57) ABSTRACT

A vehicle security system and method allows for the disabling of manual vehicle control, while automatic vehicle guidance provides control of the vehicle. The vehicle, which may be an aircraft, boat, train, truck, etc. is thus secured against unauthorized guidance that could harm passengers or other persons or property. In an embodiment, the security system automatically controls the vehicle to avoid collision with ground features when imminent collision is detected.

11 Claims, 6 Drawing Sheets

ANTI-HIJACKING SECURITY SYSTEM AND APPARATUS FOR AIRCRAFT

RELATED APPLICATION

This application is a divisional of, and claims the benefit of, U.S. patent application Ser. No. 09/967,026 filed on Sep. 28, 2001 now U.S. Pat. No. 6,584,383, entitled "Anti-Hijacking Security System And Apparatus For Aircraft," which application is hereby incorporated by reference in its entirety for all that it teaches as if wholly expressly set forth herein.

TECHNICAL FIELD

This invention relates generally to aircraft guidance and navigation, and more particularly relates to a system and method for safely disabling manual aircraft navigation or direction to avoid intentional or unintentional dangerous misdirection of the aircraft.

BACKGROUND OF THE INVENTION

On Sep. 11, 2001, the World trade center in New York, N.Y. became the object of a terrorist attack of previously unimaginable proportions. The terrorist attack utilized a simple scheme of misdirecting commercial aircraft such that the aircraft struck the twin towers of the world trade center destroying both buildings, surrounding buildings, and the aircraft themselves. The exact death toll of the attack is not currently known and may never be precisely determined due the degree of disintegration of the planes, buildings, and victims. However, it is known that at least several thousand innocent people, both passengers of the misdirected airplanes as well as occupants of the targeted building, were killed.

The financial impact of such attacks, while easily ignored in light of the great loss of life, are staggering. The sources of such loss are the material loss of structures and equipment likely to be borne by insurers, the loss of business revenue for businesses located in the affected area, the national economic inefficiencies caused as people nationwide are distracted and frightened by the attack, and the loss of revenue to airlines as frightened passengers turn to other modes of travel. There will also be litigation-related losses as affected individuals and organizations seek redress for a perceived wrongful loss of life, property, or revenue.

Simply put, this new form of attack greatly raises the potential human and economic loss that may be caused by terrorist organizations. There are many ways to attempt to minimize the casualties of such attacks. Some current efforts focus on minimizing the volume and flammability of the jet fuel that is often violently released and dispersed in collisions involving one or more aircraft. Other efforts are directed at security precautions to prevent in the first instance the introduction of weapons or explosives onto an aircraft.

Neither of these solutions is optimal, for the first fails to save the aircraft passengers themselves, while the second cannot be completely successful at detecting and stopping the passage of all weapons without great expense of time and money, and additionally fails to deter terrorist attacks carried out by purely physical strength against weaker passengers and aircraft personnel.

Other methods and systems of deterring hijacking of aircraft have been devised and attempted with varying degrees of success, but as the attack of September 11 shows, none have attained complete success.

SUMMARY OF THE INVENTION

In summary, the invention has several variations and solves the shortcomings inherent in prior systems. The primary embodiment allows a pilot or other person to trigger an aircraft security mode from within the aircraft such as by pressing a button located in the cockpit of the aircraft. The result of the entry of the aircraft into security mode is that manual navigation of the aircraft from within the cockpit is rendered impossible; the control surfaces, throttle settings, and all other aircraft navigational functions are carried out automatically from this point in time forward.

In an embodiment, the pilot or other authorized personnel may posses an override code usable to restore the ability to manually control the aircraft, in order to regain control after an accidental triggering of the security mode. There are hazards associated with allowing override. For instance, a hijacker may force the appropriate person to divulge the code.

Once in security mode, a navigation module selects a nearest landing facility from a digital database of facilities based on position sensor information and other factors, after which it utilizes the computerized navigation facilities of the aircraft to redirect the aircraft toward that facility. Approach, landing, and roll out are executed automatically by the module utilizing the computerized navigation facilities of the aircraft. In an embodiment, the module causes a signal to be transmitted to ground personnel at the selected landing facility, so that the approach path may be cleared.

In another embodiment of the invention, the guidance module periodically accesses a database of terrain features, the terrain features being identified by at least their location and altitude. The module compares the location and altitude of the features represented in the database with the aircraft's present location, altitude and other data based on sensor information such as altimeter and GPS readings. If the aircraft's heading, velocity, altitude and location indicate an imminent terrain collision, the module temporarily disables manual navigation of the aircraft in order to place the craft into a collision avoidance route.

The terrain features represented in the database may be earth features such as mountains, cliffs, etc., and also preferably include significant man-made structures such as stadiums, office buildings, and so on. In one further embodiment, the terrain features include groups or clusters. For example, a city could be represented in the database as a single feature having constant or preferably spatially varying altitude corresponding to the collective physical extent of the various structures of the city. In any case, lateral and vertical dimensions stored in the database for a given feature may include a safe zone extending beyond the actual physical dimensions of the feature.

A further embodiment enables the intervention of remote personnel. For example, in this embodiment, a remote operator may trigger the security mode of the aircraft via an encrypted radio transmission, and similarly may override the feature remotely. A further embodiment allows for remote navigation of the craft by radio once it is in security mode. Such a feature when utilized allows remote personnel to guide the craft during portions of the redirect route, such as landing.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
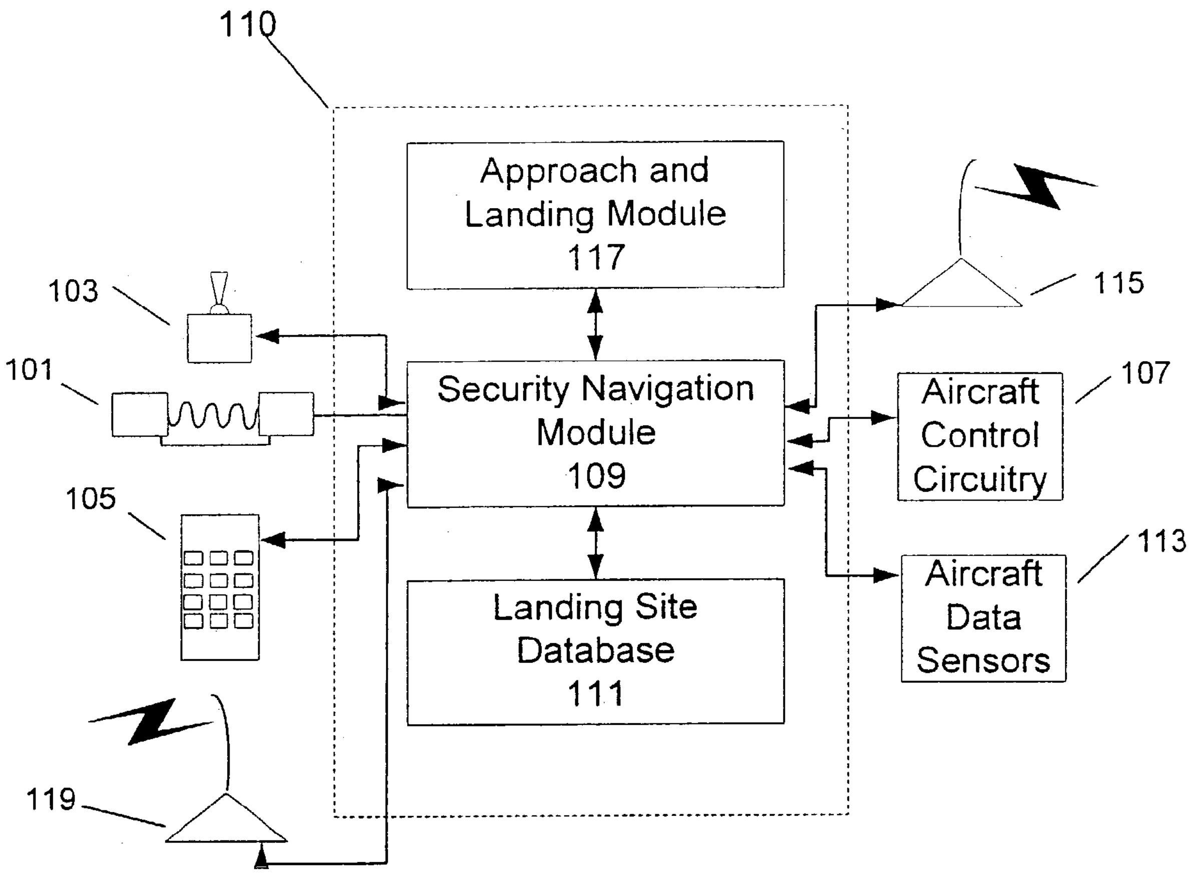
FIG. 1 is a schematic diagram of an aircraft security apparatus according to an embodiment of the invention.

Automatic aircraft guidance and landing systems are known to those of skill in the art. For the convenience of the reader, a brief discussion of certain basic aircraft navigation and guidance systems will be presented hereinafter.

The first automatic, i.e. not manually controlled, landing of an aircraft occurred on Aug. 23, 1937, when a Fokker C-14B took off from Wright Field and then automatically navigated to and landed at Patterson field several miles away. Since then, the art of aircraft position sensing and guidance have improved greatly, allowing quite sophisticated autopilot functions to be implemented. Most travelers are now aware that significant portions of each airborne journey are navigated by a computer rather than a pilot.

Although one of skill in the art will be readily familiar with the technical methodologies used to afford such automatic navigation and landing, several references are set forth below, and are each incorporated herein in their entireties, in order to aid the less skilled artisan in practicing the invention.

U.S. Pat. No. 5,526,265 to Nakhla, entitled "Alternate Destination Predictor for Aircraft," describes a system and method of identifying alternate landing sites for an aircraft. The system utilizes a database of landing sites and calculates the distance from the aircraft to a number of closest sites. Although the Naklha reference only displays this information to the pilot for his or her selection, the present invention utilizes such a data base and such calculations to automatically identify the single closest landing a site and to redirect the aircraft to that site. Accordingly, U.S. Pat. No. 5,526,265 is incorporated herein by reference in its entirety for all that it discloses.

U.S. Pat. No. 6,178,363 to McIntyre et al, entitled "Inertially Augmented GPS Landing System," and U.S. Pat. No. 6,154,693 to Aberschitz et al, entitled "Automatic Aircraft Landing," describe systems relevant to automatically landing an aircraft. Accordingly, U.S. Pat. No. 6,178,363 and U.S. Pat. No. 6,154,693 are incorporated herein by reference in their entireties for all that they disclose.

Similarly, U.S. Pat. No. 5,113,346 to Orgun et al., entitled "Aircraft Automatic Landing System With Engine Out Provisions," U.S. Pat. No. 6,126,111 to Burcham, Jr. et al., entitled "Emergency Flight Control System Using One Engine and Fuel Transfer," U.S. Pat. No. 3,604,908 to Loome, entitled "Landing Control System For Aircraft," U.S. Pat. No. 3,626,163 to Dommasch, entitled "Automatic Landing System," U.S. Pat. No. 6,237,496 to Abbott, entitled "GPS Guided Munition," U.S. Pat. No. 5,142,478 to Crook, entitled "Computerized Aircraft Landing And Takeoff System," U.S. Pat. No. 5,047,946 to King, et al., entitled "Aircraft Navigational System And Method For Guiding An Aircraft Along Intersecting Airways," and U.S. Pat. No. 6,205,377 to Lupash et al, entitled "Method For Navigation of a Moving Platform by Using Satellite Data Supplemented by Satellite-Calibrated Baro Data," all teach techniques relevant to automatic guidance and/or landing of aircraft or airborne vehicles, and are incorporated herein by reference in their entireties for all that they disclose.

The presentation by Clark E. Cohen et al, entitled "Automatic Landing of a 737 Using GNSS Integrity Beacons," describes an automatic landing system and technique, and is incorporated by reference herein in its entirety for all that it discloses. The abstract of that paper is included herein below:

Automatic Landing of a 737 using
GNSS Integrity Beacons

Clark E. Cohen, H. Stewart Cobb, David G. Lawrence, Boris S. Pervan, Andrew K. Barrows, Michael L. O'Connor, Konstantin Gromov, Gabriel H. Elkiam, Jock R. I. Christie
J. David Powell, and Bradford W. Parkinson
Department of Aeronautics and Astronautics
Stanford University
Gerald J. Aubrey, Willaim Loewe
United Airlines
Douglas Ormiston
Boeing Commercial Airplane Group
B. David McNally, David N. Kaufmann
NASA Ames Research Center
Victor Wullschleger
Federal Aviation Administration Technical Center
Ray Swider
Federal Aviation Administration
Presented at ISPA, Braunschweig Germany, February 1995

Differential GNSS and miniature, low-cost Integrity Beacon pseudolites were used to carry out 110 successful automatic landings of a United Boeing 737–300 aircraft. The goal was to demonstrate Required Navigation Performance (RNP)—including accuracy and integrity—for Category III Precision Landing using GNSS. These autopilot-in-the-loop flight tests using GNSS Integrity Beacons (low-power, ground-based marker beacon pseudolites placed under the approach path) furnish evidence that GNSS can provide the full performance necessary to meet the stringent specifications of Category III.

It has been demonstrated that Integrity Beacons can provide consistent accuracies on the order of a few centimeters. But perhaps even more important, this centimeter-level accuracy coupled with the built-in geometrical redundancy provided by Integrity Beacon ranging provides an exceptional level of intrinsic system integrity. This integrity is calculated to be easily better than the required one part in a billion probability of missed detection. Passenger safety is improved significantly because this level of integrity is achieved independently from ground-based monitors through Receiver Autonomous Integrity Monitoring (RAIM).

For the flight test, the GPS receiver and single-channel navigation computer calculated precise positions and calculated glide path deviations. An analog interface provided ILS localizer and glideslope signals to the autopilot. The 737 was equipped with a dual-channel flight control system which was previously certified for Category IIIA landings. The autolands were performed through touchdown without rollout guidance. The series of 110 automatic landings were carried out at NASA's Crows Landing facility in California over a four-day period during the week of Oct. 10, 1994. A laser tracker was used as an independent means for characterizing flight performance. The feasibility demonstration was sponsored by the FAA.

The following references are each incorporated herein by reference in their entireties for all that they disclose and also specifically for their teachings related to automatic aircraft guidance and terrain feature database creation and use: Bice, "Development of an Automated Ground Collision Avoidance System Using A Digital Terrain Database," Wright Patterson AFB, 1989. Hewitt, "The Use of Terrain Databased for Avionic Systems," The Institution of Electrical Engineers, 1995. "Terrain Databases and Their Use In Navigation and Collision Avoidance," Institute of Electrical Engineers, Electronics Division Colloquim, Professional Group E15, Radar Sonar and Navigation Systems, Digest No. 1995/066, 1995, paper by Allerton. Woodward and Hoover, "Passive Terrain Following Using Stored Map and Global Positioning System," IEEE, 779–785, 1981. Kerrill, Tamara, "Satellite-Guided Airplane Flies Right Into the Future," Chicago Sun-Times, Oct. 28, 1994, p. 22.

Similarly, other patented techniques for navigation based on databases of locations or terrain features such as mountains or airports are also known to those of skill in the art. Such patented techniques include the teachings of the following patents, all of which are incorporated herein by reference in their entireties for all that they disclose and also specifically for their teachings related to automatic aircraft guidance and terrain feature database creation and use: U.S. Pat. No. 6,199,015, to Curtwright et al, entitled "Map-Based Navigation System With Overlays," U.S. Pat. No. 6,219,592, to Muller, et al., entitled "Method And Apparatus For Terrain Awareness," U.S. Pat. No. 6,292,721, to Conner, et al., entitled "Premature Descent Into Terrain Visual Awareness Enhancement To EGPWS," U.S. Pat. No. 6,092,009, to Glover, entitled "Aircraft Terrain Information System," and U.S. Pat. No. 5,884,222, to Denoize, et al, entitled "Collision Avoidance Device For Aircraft, Especially For Avoiding Collisions With The Ground."

An anti ground collision technique of particular interest is presented in U.S. Pat. No. 4,924,401 to Gregory Bice et al, entitled "Aircraft Ground Collision Avoidance And Autorecovery Systems Device," which is hereby incorporated by reference in its entirety for all that it discloses. The system described in the U.S. Pat. No. 4,924,401 patent does not teach the security system presented by the present invention. The recovery method of the U.S. Pat. No. 4,924,401 falls short for the purposes of the invention in at least the following regards. First, the automatic recovery system may be overridden manually, and such override is not described to be code protected so as to prevent intentional misdirection of the craft. Additionally, the information upon which the autorecovery operation is initiated is insufficient to adequately protect ground and airborne personnel from intentional collision and does not allow the terrain database adaptability necessary to providing ease of use of the system as well as allowing efficient and convenient flight patterns. Nonetheless, the U.S. Pat. No. 4,924,401 patent does describe useful techniques for detecting an imminent collision, and of automatically taking evasive action.

U.S. Pat. No. 4,314,341 to Kivela entitled "Aircraft Automatic Pilot With Automatic Emergency Descent Control Apparatus," describes the inverse of the ground collision solution. In particular, the U.S. Pat. No. 4,314,341 teaches a system for automatically returning an aircraft to a sufficiently low altitude after a high-altitude loss of cabin pressure. Although the U.S. Pat. No. 4,314,341 patent does not teach the security system of the present invention, it nonetheless provides useful background information, and is herein incorporated by reference in its entirety for all that it discloses.

Turning to the drawings, FIG. 1 illustrates the architecture of a system for implementing an embodiment of the present invention. The operation of the invention will be described by way of the flowchart of FIG. 2 with reference to the architecture of FIG. 1.

At step 201, the pilot of an aircraft detects an unauthorized individual that the pilot suspects is attempting or will attempt to take control of the aircraft. Note that this step may alternatively be carried out automatically. That is, the pilot or other personnel may have activated a perimeter or boundary alarm 101 that automatically detects entry into a protected zone (e.g. the cockpit) or traversal of a protected boundary (e.g. the threshold of the cockpit entryway) and thereafter automatically triggers entry of the security module 110 into a security mode as described at step 215. Such detection mechanism may be mechanical, photoelectric, etc. as will be readily appreciated by those of skill in the art. This embodiment is particularly useful where the cockpit is easily penetrated and there is sufficient probability that the pilot and other cockpit personnel could be overpowered by unauthorized personnel before they are able to manually activate the security mode. The possibility of accidental triggering is increased in this embodiment, and hence it is preferable although not necessary that the security mode be overridable through the use of an access code input to a keypad 105 or other entry mechanism such as voice receipt hardware.

At step 203, if detection is not automatic, the security mode of the security module 110 is triggered by manual manipulation of a conveniently situated actuator 103. At step 205, the security navigation module 109 of the security module 110 asserts control of the aircraft via the aircraft control circuitry 107. Preferably this entails initially disabling manual navigation of the plane and placing the aircraft into a wings-level attitude at constant altitude. It will be appreciated that the aircraft control circuitry will often be distributed, and thus that the security navigation module 109 will access all such circuitry centrally through wiring harnesses or other secure connection means.

At this point, whether or not the pilot is alive or dead, conscious or unconscious, the unauthorized individual will be unable to manually control any of the plane's critical functions. Thus they will be unable to steer, guide, accelerate, or decelerate the craft, nor will they be able to actuate flaps, slats, trim tabs, or fuel system functions. They will be unable to affect cabin pressure. In short, the plane's critical systems will be locked and controllable only by the security module 110.

At step 207, the security navigation module 109 searches a database 111 of landing sites, and locates the nearest suitable site based on the craft's present location as sensed via GPS, ground beacons or other means included in or accessible by the aircraft data sensor module 113. Other sensor inputs available to the sensor module 113 include aircraft altitude, aircraft attitude in pitch and roll, aircraft descent/ascent rate, aircraft stall warning data, aircraft roll rate data, aircraft turn rate data, aircraft air velocity and heading data, aircraft ground roll speed data, aircraft fuel level and weight data, ground beacon receiver data, control surface position data, and any other data usable for accurate aircraft air and ground control and handling.

At step 209 the security navigation module 109 calculates a path sufficient to efficiently take the aircraft to the selected landing site automatically, and guides the aircraft onto the calculated path, being sure to stay within the design constraints of the aircraft and the physical limitations of typical passengers to such phenomena as G-forces.

At step 211, the security navigation module optionally causes the aircraft transponder or other radio transmission device 115 to broadcast an emergency warning signal to ground personnel, preferably including personnel at the selected landing site directly or indirectly, such as by human or automatic repeater. In this manner, air control personnel are apprised of the situation and may clear a corridor for the stricken aircraft, and may ensure that all runways and approaches are clear. Additionally, ground personnel may thus assure that armed authorities are present to meet the plane once on the ground.

When the aircraft arrives at the beginning of a descending approach path, the security navigation module 109 invokes the facilities of the automatic approach and landing module 117 at step 213 to guide the aircraft to a safe landing and rollout. Such automatic approach and landing techniques including rollout control are familiar to those of skill in the art, and are also further described in several of the patent and paper references as discussed above.

Note that the security module may optionally be remote controlled, have the security mode remotely activated, and/or have the security mode remotely overridden via a preferably encrypted control signal received at RF receiver/transmitter 119 from ground personnel or other personnel remotely situated such as in a nearby aircraft. The control data conveyed to remote personnel is either visual or otherwise based on ground borne sensors such as radar etc., or is gathered by radio downlink from aircraft borne sensors via RF receiver/transmitter 119.

Figure 2:
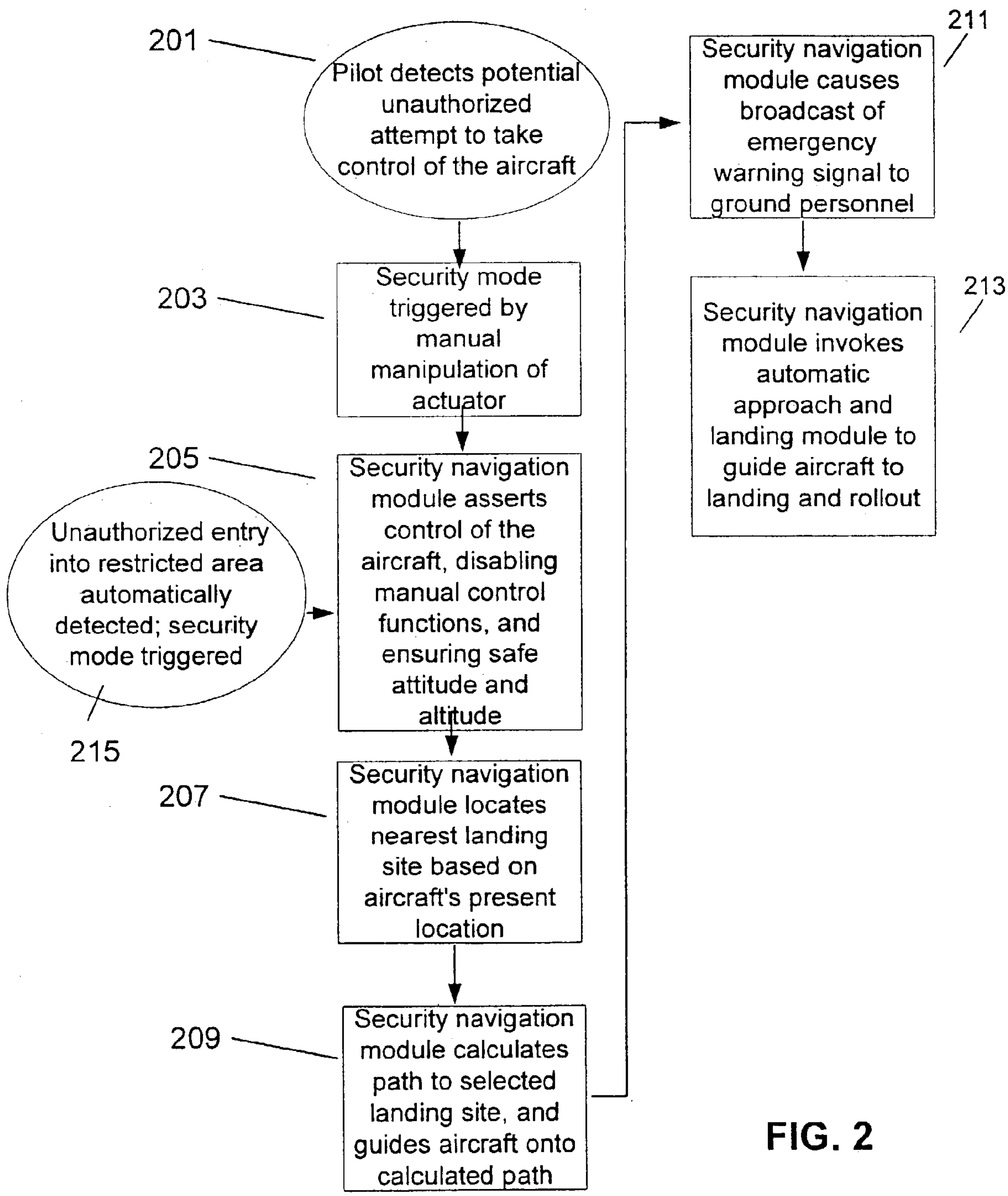
FIG. 2 is a flow chart illustrating steps taken in an embodiment of the invention to secure an aircraft against unauthorized misdirection.

It will appreciated that the system and method described herein with reference to FIGS. 1 and 2 allows an aircraft to be secured against unauthorized navigation at the hands of a terrorist, hijacker or other person or persons, and thus prevent the misdirection of the aircraft into the ground, a building, or other structure or feature. At the same time, the aircraft is returned to a safe landing location to secure the safety of the aircraft, the passengers, and any personnel on the ground that might otherwise become victims of a collision. The nearest landing site may or may not be a scheduled departure or scheduled landing site of the aircraft.

In another embodiment of the invention, an aircraft is secured against accidental or intentional misdirection of the aircraft into the ground, a ground borne structure such as a building or arena, or other feature. In overview, the collision avoidance system automatically detects an impending collision with some feature and executes evasive actions of the aircraft to avoid the impending collision. The aspects of this embodiment may be used in cooperation with or independently of the above-described embodiments.

Figure 3:
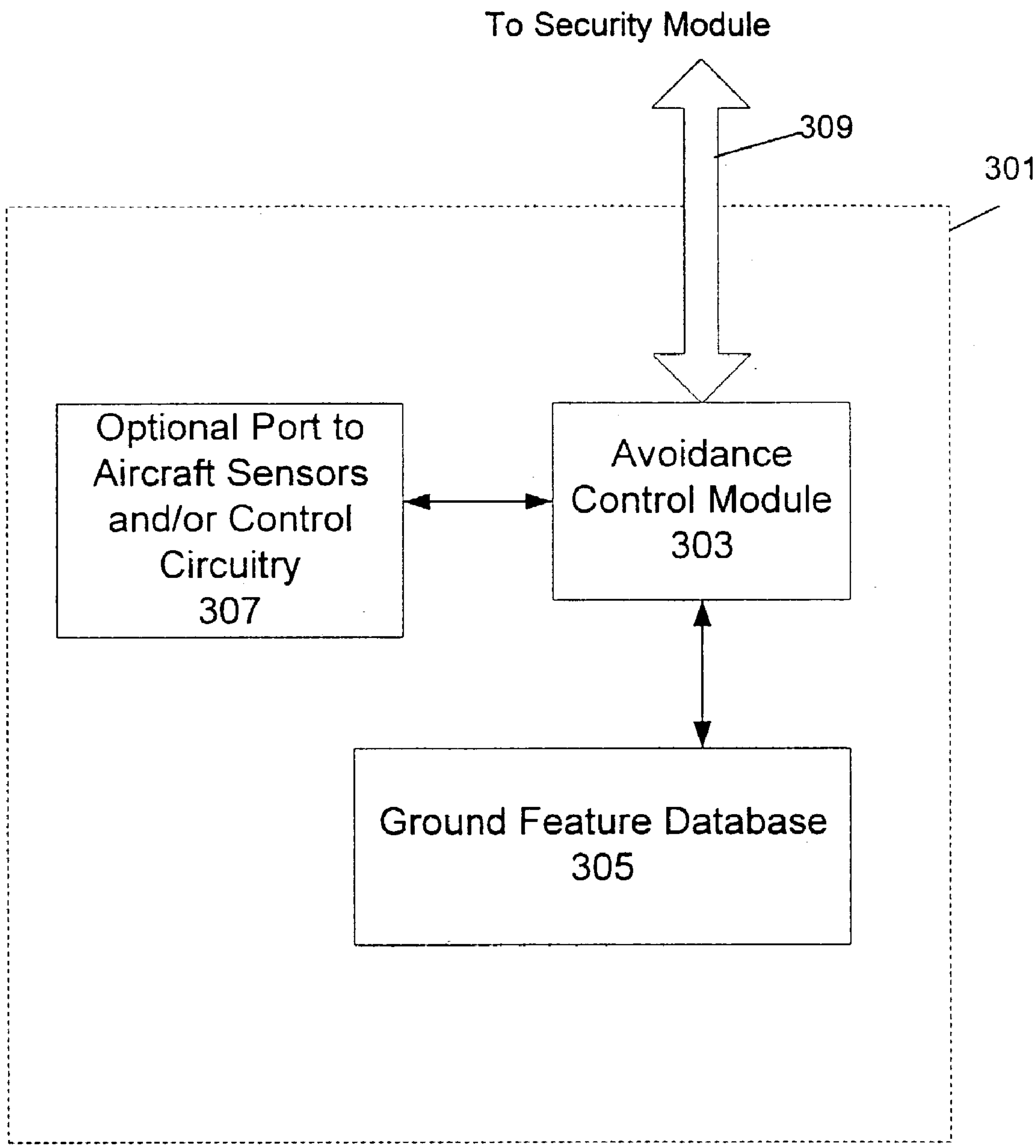
FIG. 3 is a schematic diagram of an aircraft security apparatus for avoiding collisions with ground objects and features according to an embodiment of the invention.
Figure 4:
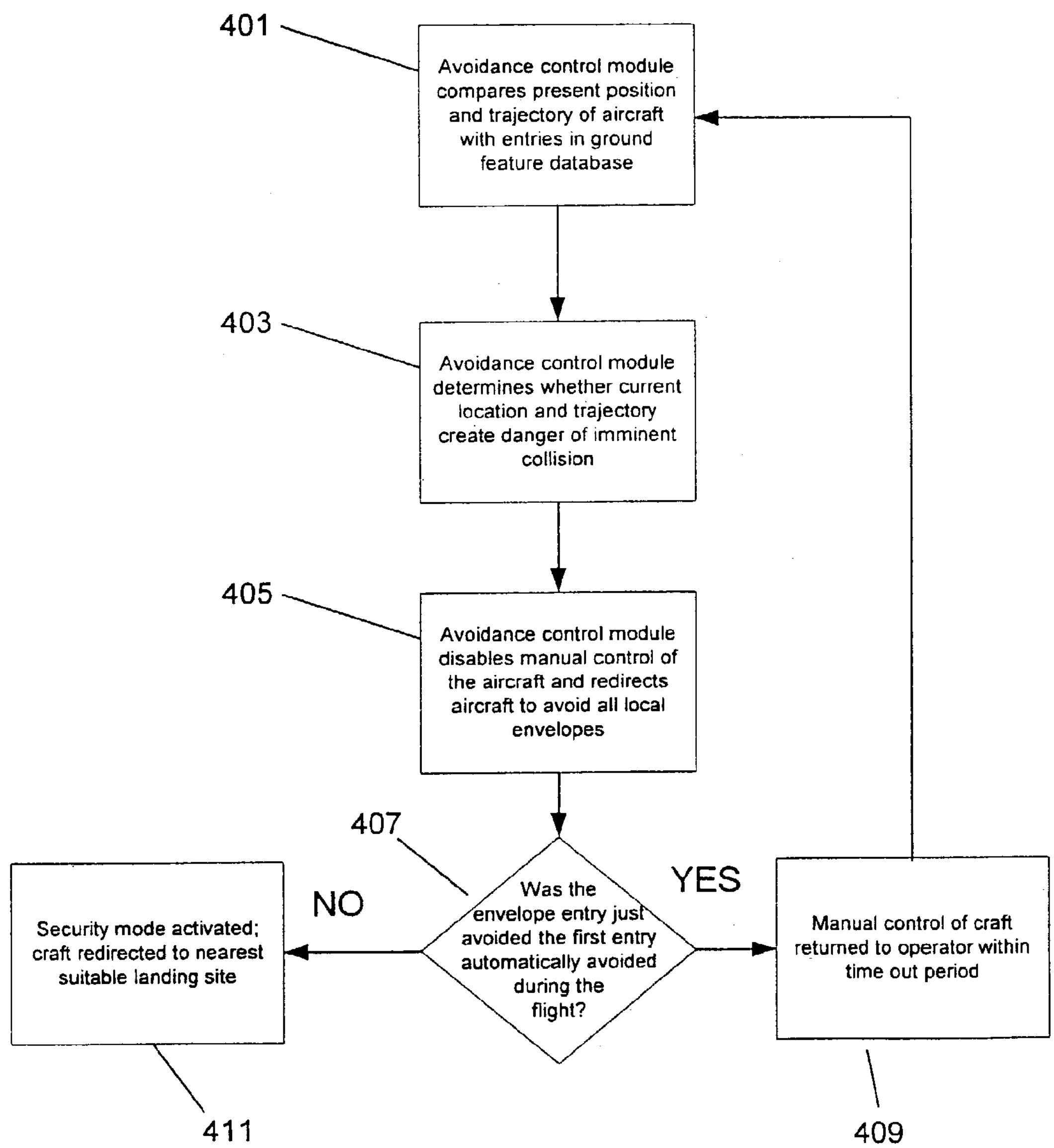
FIG. 4 is a flow chart illustrating the steps executed during collision avoidance according to an embodiment of the invention.
Figure 5A:
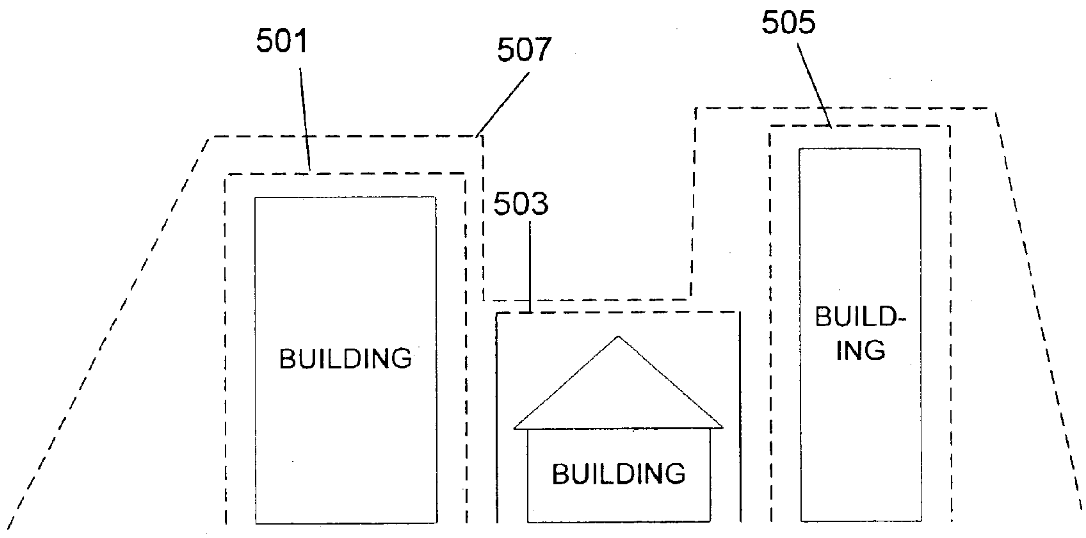
FIG. 5*a* is a simplified representation of a cluster of buildings, such as in a city, as well as possible protection envelopes associated with such ground features according to an embodiment of the invention.
Figure 5B:
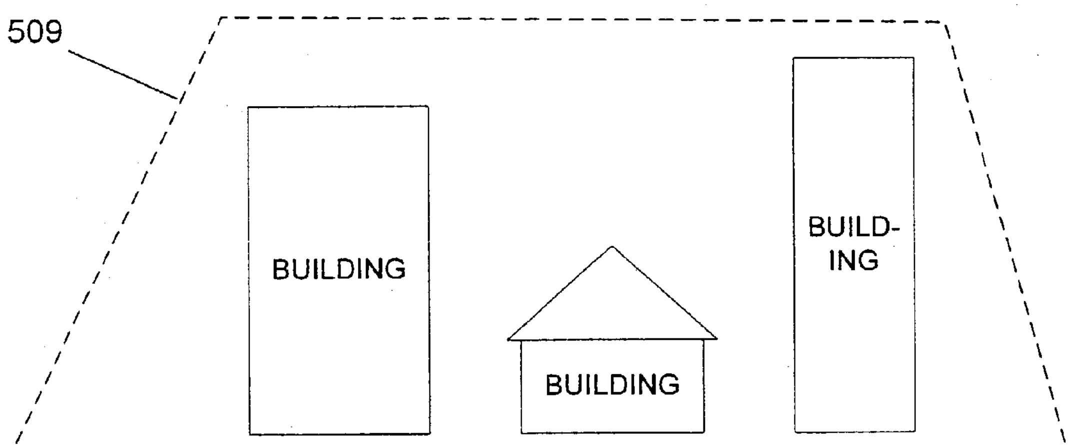
FIG. 5*b* is a simplified representation of a cluster of buildings, such as in a city, as well as a possible protection envelope associated with such ground features according to an embodiment of the invention.

Referring to FIGS. 3–6, there is shown the system and method of automatic terrain collision avoidance utilizing a database of ground borne features or a database derived from a listing of ground borne features. FIG. 3 illustrates the architecture of the collision avoidance system 301, which will be described in conjunction with the flow chart of FIG. 4, showing the operation of the collision avoidance system. At step 401, the avoidance control module 303 of the collision avoidance system 301 compares the present position and trajectory of the aircraft with entries in a ground feature database 305 containing representations of the position and physical extent of local ground borne features.

The trajectory and location information are supplied to the avoidance control module 303 either directly from the aircraft sensor systems via port 307 or indirectly from the security module 110 of FIG. 1 via link 309. The ground feature database 305 is preferably pre-generated by earlier survey or data entry. For example, human operators may create all or some of the database 305 by entering the locations and physical dimensions, including height, of ground features. This is especially useful for sharply rising local structures such as buildings. Rather than create a three-dimensional envelope entry for each ground structure such as each building in a city, illustrated as envelopes 501, 503, and 505 in FIG. 5*a*, the database may be constructed to contain a three-dimensional envelope structure for a group of structures such as all or part of a city, illustrated as envelope 507 in FIG. 5*a*. This simplifies the task of data entry or collection and also simplifies and shortens the search and compare process executed by avoidance control module 303 at step 401. Note also that such a group envelope may be contoured to fit the ground features as with envelope 507 OF FIG. 5*a*, or may be flat or linearly varying, accommodating the highest local structure as with envelope 509 in FIG. 5*b*.

Although the database 305 preferably contains entries for the features of many locations, the compare process of step 401 preferably is executed with respect to only a subset of the database features, i.e. those that are closest to the current aircraft location, such as those within 70 miles of the aircraft's current location.

At step 403, the avoidance control module 303 determines whether the current location and trajectory of the aircraft create a danger of imminent entry into the envelope of any ground feature identified in the database 305, such as envelopes 501–509 illustrated in FIG. 5. If such entry is determined to be immediately imminent, within some buffer time period such as 1 minute, the avoidance control module disables manual control of the aircraft in step 405, and redirects the aircraft in an upward or lateral path calculated to avoid all local envelopes preferably using the control mechanisms described above with respect to the security navigation module 109.

Manual control of the craft may be returned to the operator at step 409 within a time out period such as the period before expiration of the buffer time period, and the control process reset to step 401 if it is determined at step 407 that the envelope entry just avoided was the first such imminent entry automatically avoided during the flight, i.e. since last take off. However, if it is determined at step 407 that such avoidance was not the first required during the flight, the security mode described above with respect to FIG. 1 is activated in step 411, via link 309, based on the assumption that an unauthorized or incapacitated operator is at the helm of the craft.

Note that the avoidance control module 303 is preferably communicably linked to the security module 110 via bi-directional link 309. In this manner the avoidance control module 303 may use the navigation and communication facilities of the security module 110, and may activate the security mode of the security module 110 as described above. Aircraft sensor data may optionally be obtained by the avoidance control module directly from the aircraft systems themselves via port 307. Note also that ground feature database 305 may include landing location information and may thus also serve the function of landing site database 111.

The flow chart of FIG. 4 is exemplary and those of skill in the art will understand that it, as well as any other figure or description, may be varied without departing from the scope of the invention. For instance, the security mode may be activated on the first instance of automatic envelope avoidance, or may be activated after three, four, or more such avoidances.

Figure 6:
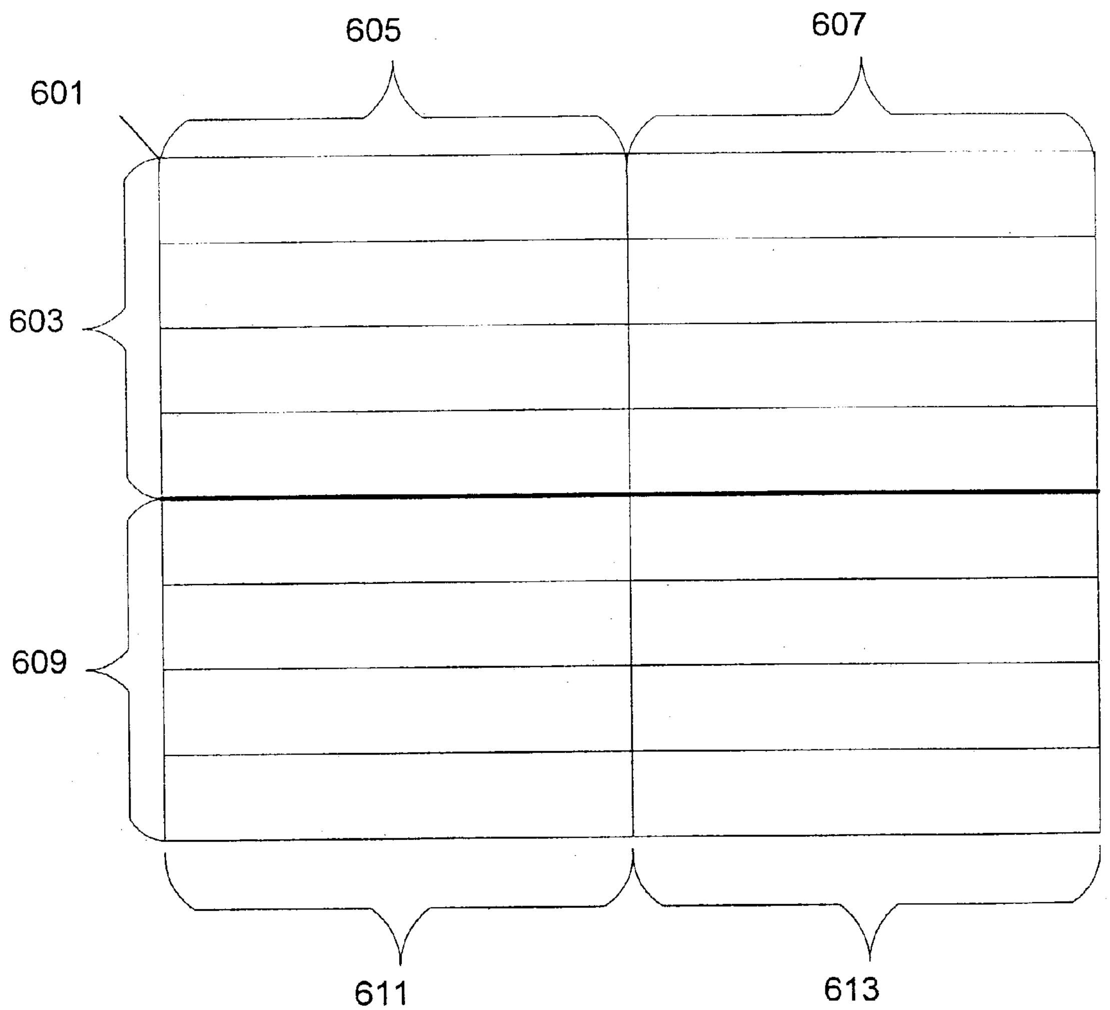
FIG. 6 is a diagram of a data structure usable within embodiments of the invention to store ground feature information as well as possibly landing site information.

A form of the database 305 is illustrated in FIG. 6. Entries 603 of the data structure 601 corresponding to the database 305 contain both location 605 and physical extent, including height or altitude, 607 fields. The physical extent information contained in field 607 preferably contains information related to the physical extent of the feature. Both physical extent and altitude information in fields preferably correspond not exactly to the physical dimensions of the relevant feature or feature cluster, but rather to a finite buffer envelope around the feature or cluster.

Entries 609 correspond to the entries of the landing site database 111 if separate, or the entries of the ground feature database 305 corresponding to suitable landing sites if both databases are merged. The landing site entries 609 preferably include at least a location field 611, and may also include an additional field or fields 613 containing other information related to the suitability of the landing site. Such information may include field length, landing site guidance facilities, and so. For example, if the aircraft sensors indicate essentially full fuel tanks, a longer field for landing may be required, rendering the closest existing landing site not necessarily the closest suitable landing site.

Although the examples given herein describe security actions and mechanisms relative to an aircraft, those of skill in the art will appreciate that many of the features described are also applicable to other vehicles such as boats, particularly large cruise or cargo vessels, as well as trains, especially those carrying passengers or hazardous cargo, as well as trucks, especially those bearing hazardous chemicals or materials.

For such earth-bound vehicles, the guidance problem is greatly simplified. A security module implemented to protect a train may simply cause the train to come to a controlled stop in response to a triggering of a security mode. Similarly a security module implemented to protect a truck may simply disable the truck engine, rendering the truck useless for attacks on others. A security module implemented to protect a boat may either stop the boat when security mode is triggered or may guide the boat to an acceptable port analogously to the nearest suitable landing site with respect to the aircraft security mode described above. In any of the cases just described, the security module may still automatically cause to be transmitted a radio signal, the signal identifying the stricken vehicle and its location. Similarly, many of the other features described with respect to the aircraft security mode apply analogously to these other forms of transportation.

It will be appreciated that a novel vehicle security method and control architecture and system have been described herein. In view of the many possible embodiments to which the principles of this invention may be applied, it should be recognized that the embodiments described herein with respect to the drawing figures are meant to be illustrative only and should not be taken as limiting the scope of the invention. Those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

I claim:

1. A method of securing an aircraft having a cockpit against misdirection resulting in a collision with a building or other ground structure or feature, comprising the steps of: comparing a current location of the aircraft with the location of a particular ground feature in the vicinity of the aircraft's current location by searching a database of ground feature locations; determining, based on the step of comparing, that the current aircraft location and trajectory create a danger of imminent collision of the aircraft with the particular ground feature; automatically disabling manual control of aircraft navigation based on the step of determining such that manual manipulation of flight controls from within the cockpit no longer affects the flight of aircraft regardless of the extent of manual manipulation; and calculating and causing to be automatically executed an evasive action of the aircraft whereby a collision with the particular ground feature is averted.

2. The method of claim 1 further comprising the steps of; determining that the automatically executed evasive action was not the first such evasive action automatically executed since the latest take off of the aircraft; and in response to the step of determining that the automatically executed evasive action was not the first such evasive action automatically executed, triggering a security mode, whereby manual control of aircraft navigation continues to be disabled, and the airplane is automatically redirected to and landed at a nearest suitable landing site.

3. The method of claim 1 further comprising the steps of; determining that the automatically executed evasive action was the first such evasive action automatically executed since the latest take off of the aircraft; and re-enabling manual control of aircraft navigation.

4. The method of claim 1 wherein the database of ground features comprises a set of location and physical extent data fields associated with a corresponding set of ground features.

5. The method of claim 4 wherein the database contains a ground feature associated with a group of buildings, and wherein the physical extent data field associated with the ground feature defines a single spatial envelope that encompasses the group of buildings.

6. The method of claim 4 wherein the physical extent data field associated with a particular ground feature defines a spatial envelope that encompasses both the exact physical dimensions of the ground feature as well as a buffer region extending beyond the exact physical dimensions of the ground feature.

7. The method of claim 1 further comprising receiving a signal for reenabling manual manipulation of flight controls, and in response to such signal, reenabling manual manipulation of flight controls such that manual manipulation of flight controls affects the flight of the aircraft.

8. The method of claim 7 wherein the signal for reenabling manual manipulation of flight controls emanates from a source remote to the aircraft.

9. The method of claim 7 wherein the signal for reenabling manual manipulation of flight controls originates from a source within the aircraft.

10. The method of claim 9 wherein the signal for reenabling manual manipulation of flight controls originates from input of a code sequence.

11. The method of claim 10 wherein the code sequence is manually entered by a human operator.

* * * * *